United States Patent [19]

Chemnitz

[11] Patent Number: 4,634,833

[45] Date of Patent: Jan. 6, 1987

[54] FIRE EXTINGUISHING SYSTEM FOR AN ELECTRIC ARC WELDING APPARATUS

[76] Inventor: Christian Chemnitz, Allerupvej 5, Hjallerup DK-9320, Denmark

[21] Appl. No.: 796,271

[22] Filed: Nov. 8, 1985

Related U.S. Application Data

[63] Continuation-in-part of Ser. No. 574,269, Jan. 26, 1984, abandoned.

[30] Foreign Application Priority Data

Feb. 16, 1983 [DK] Denmark ............................ 668/83

[51] Int. Cl.⁴ ............................................. B23K 9/16
[52] U.S. Cl. .................................. 219/137 R; 169/46; 219/74; 219/136
[58] Field of Search .................... 219/72, 74, 132, 136, 219/137 R; 169/46

[56] References Cited

U.S. PATENT DOCUMENTS

| | | | |
|---|---|---|---|
| 3,557,337 | 1/1971 | Sipos et al. | 219/74 |
| 3,581,051 | 5/1971 | Brown | 219/132 |
| 3,808,397 | 4/1974 | Wixson | 219/74 |
| 4,100,390 | 7/1978 | Jackson | 219/74 |

FOREIGN PATENT DOCUMENTS

| | | | |
|---|---|---|---|
| 1242015 | 8/1960 | France | 219/74 |
| 54-71742 | 6/1979 | Japan | 219/74 |

*Primary Examiner*—Clifford C. Shaw
*Attorney, Agent, or Firm*—Merchant, Gould, Smith, Edell, Welter & Schmidt

[57] ABSTRACT

A fire extingushing system for an electric welding apparatus is disclosed having a source of inert gas which can be activated by switches (27, 28) in a torch (20) which provides a two-step flow of gas through magnetic valves (40, 44). In the preferred embodiment, a low level flow of 3 to 5 liters is provided by activating one of the switches and a fire extinguishing and cleaning flow of 10 to 40 kiloliters is provided by activating the remaining switch. The operator of the system can extinguish a newly started fire and clean the welding tip without need to put the apparatus down and obtain other equipment for these purposes.

3 Claims, 1 Drawing Figure

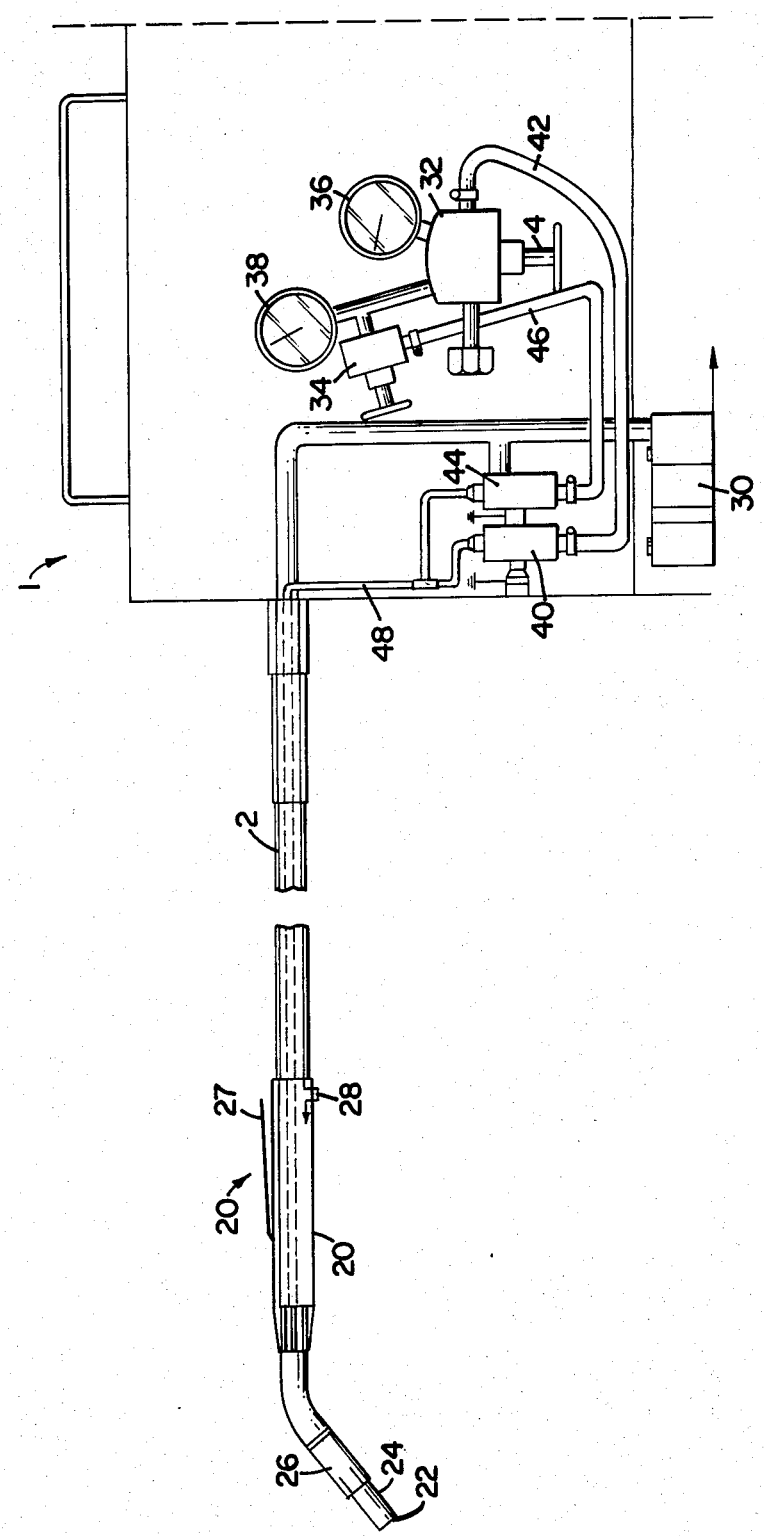

FIRE EXTINGUISHING SYSTEM FOR AN ELECTRIC ARC WELDING APPARATUS

This application is a Continuation-in-Part of application Ser. No. 574,269 filed Jan. 26, 1984 now abandoned.

TECHNICAL FIELD

The invention relates to a fire extinguishing system for an electric arc welder of the kind which has a welding wire extending from the welding torch.

BACKGROUND OF THE INVENTION

One of the problems in welding is that the surroundings can be set on fire caused by either high temperatures at the welding place or welding sparks. Through the years, this has led to fire damage, which could have been avoided if the fire had been extinguished at the very moment of starting.

The purpose of the invention is to provide a system to extinguish fires and thereby mitigate the aforementioned disadvantage as well as provide a simple method for cleaning the welding nozzle.

SUMMARY OF THE INVENTION

The present invention relates to a method and apparatus for extinguishing fires related to electric arc welding.

In the method, a shroud of inert gas is supplied around the welding nozzle at the electrode to avoid oxidation. This shroud is activated by switch means which control a valve providing a fixed flow of inert gas. At the point a fire begins, a second switch may be activated which increases the flow of gas to the welding nozzle thereby flooding the region with inert gas and extinguishing the fire.

In the apparatus, a welding pistol is provided with a central core electrode and an outer generally cylindrical fluid passage for developing a shroud of gas around the electrode. First and second switches are provided to supply a flow of inert gas at lesser and greater levels of flow when activated. The first level provides a flow to inhibit oxygen from reaching the welding point while the second switch provides a flood of gas to extinguish any flame.

BRIEF DESCRIPTION OF THE DRAWINGS

The FIGURE shows in schematic form a preferred embodiment of the apparatus of the present invention.

DETAILED DESCRIPTION OF THE PREFERRED EMBODIMENT

A fire extinguishing system 1 which preferably includes a hose 2 and torch 20 attached thereto. Running through the hose and torch is an electric wire forming a welding electrode 22 and a gas supply tube 48 for supplying the inert gas from the supply to the electrode and therearound. The tube 48 likewise extends through the hose and torch. At its distant end, torch 20 includes a cylindrical member 24 for supporting the electrode 22 and to provide a fluid passage out of the nozzle to thereby create a cylindrical shroud of gas at the electrode 22 when activated. Torch 20 further includes switches 27 and 28 which provide varying gas flows as explained hereinafter.

The supply section 1 includes a power supply for welding 30 and inert gas supply (not shown), first and second pressure adjusting and reduction valves 32 and 34 and their associated meters 36 and 38.

An inert gas supply such as carbon dioxide is supplied to valve 32 which is adjusted by screw 4 to get the appropriate rough reading on meter 36. The outlet of valve 32 is supplied to valve 34 which can provide further pressure reduction as indicated by meter 38. A second outlet from gas valve 32 is provided to magnetic valve 40 by tube 42 and the output of valve 34 is provided by a like magnetic valve 44 by tube 46. The outputs of valves 40 and 44 are combined into tube 48 which then passes to cylindrical portion 24 thereby creating the shroud when activated.

In the preferred embodiment, switch 27 is electrically connected by wiring obvious to a person skilled in the art to activate magnetic valve 40 while switch 28 likewise activates valve 44. Wires for the switches would be provided in tube 2 (not shown). An alternate embodiment could reverse the wiring of switches 27 and 28 to operate the opposite valves. This is merely a matter of convenience to the user.

In operation, the welding operator will activate switch 27 at the time welding is initiated to provide a flow of inert gas near the welding site. This will preferably provide a flow of 3 to 5 liters per minute of inert gas.

In the event a fire occurs at or near the welding site, the operator will activate switch 28 which preferably produces a gas flow of 10 to 40 kiloliters per minute. This high gas flow is through reduction valve 34 and magnetic valve 44 and through hose 48, which will flood the welding site with a non-combustible gas, thereby extinguishing the flame without the need for the operator to put down the welding pistol and attend to the fire by other means. Once the fire has been extinguished, switch 28 is then released and welding can resume.

If the welding nozzle becomes dirty, a blast of gas created by activating switch 28 will also tend to clean the nozzle without the operator having to put down the equipment.

It is possible to, by simple means, wire switches 27 and 28 such that only one of the two valves 40 or 44 may be activated at one time and that valve 40 shall override valve 44. This can be accomplished by simple relay circuits.

I claim:

1. A method of extinguishing fires from an electric arc welder having a welding torch with an electrode and an outlet to supply a non-flammable gas to the welding site, the gas being supplied from a single supply through flow restrictor means having two levels of flow, each activated by switch means in said welding torch comprising the steps of activating said switch means to provide a first predetermined gas flow to shield the welding site from air, and activating said switch means to provide a second and greater flow of gas to the welding site to extinguish the fire.

2. A method according to claim 1 wherein the first gas flow is 3 to 5 liters of inert gas per minute and wherein said second flow of gas is 10 to 40 kiloliters per minute.

3. A system for extinguishing a fire from an electric arc welder comprising a welding torch having a central electrode and a gas outlet adjacent thereto and concentric around said electrode, a single supply of inert gas connected to said gas outlet, first and second electrically operated flow restrictors connected in parallel with each other and together in series with said outlet to control the flow thereto, first and second switches in said torch for activating said first and second restrictors respectively, said first restrictor providing a first predetermined flow of gas to said outlet and said second restrictor providing a greater flow to said site, so that when said first switch is activated to bathing flow of gas is provided and when said second switch is activated a flooding flow of gas is provided to extinquish any starting fire.

* * * * *